United States Patent [19]

Suzuki et al.

[11] Patent Number: 4,859,360
[45] Date of Patent: Aug. 22, 1989

[54] CHOLESTERIC LIQUID CRYSTAL FORMULATIONS AND TIME/TEMPERATURE MONITORING MEANS

[75] Inventors: Fred K. Suzuki, Arlington Heights; Sharon M. Mead, Streamwood; Noble H. Yoshida; Robert H. Dobberstein, both of Arlington Heights, all of Ill.

[73] Assignee: Biosynergy, Inc., Arlington Heights, Ill.

[21] Appl. No.: 842,631

[22] Filed: Mar. 21, 1986

Related U.S. Application Data

[63] Continuation-in-part of Ser. No. 545,910, Oct. 27, 1983, abandoned.

[51] Int. Cl.⁴ ...................... C09K 19/36; G01K 11/12
[52] U.S. Cl. .............. 252/299.7; 252/408.1; 374/106; 374/162
[58] Field of Search ............ 252/408.1, 299.7, 299.01; 374/102, 106, 160, 161, 162

[56] References Cited

U.S. PATENT DOCUMENTS

| | | |
|---|---|---|
| 3,580,865 | 5/1971 | Goldberg ..................... 252/299.7 |
| 3,594,126 | 7/1971 | Fergason et al. . |
| 3,619,254 | 11/1971 | Davis ............... 252/299.7 |
| 3,642,348 | 2/1972 | Wysocki et al. .............. 252/299.7 |
| 3,697,297 | 10/1972 | Churchill et al. . |
| 3,720,623 | 3/1973 | Cartmeu et al. ............... 252/299.7 |
| 3,885,982 | 5/1975 | Fergason ....................... 252/299.7 |
| 4,045,383 | 8/1977 | Koff .............................. 252/299.7 |
| 4,064,872 | 12/1977 | Caplan .......................... 252/299.7 |
| 4,161,557 | 7/1979 | Suzuki et al. ............. 252/299.7 X |
| 4,354,385 | 10/1982 | Fraschini ....................... 252/299.7 |

OTHER PUBLICATIONS

Marion Scientific, "Is the Temperature of This Blood . . .?", brochure, 1/20/1984.

Primary Examiner—John S. Maples
Attorney, Agent, or Firm—Leydig, Voit & Mayer

[57] ABSTRACT

Described are cholesteric liquid crystal formulations suitable for use as indicators of time and/or temperature, and methods for reliably characterizing and reproducing initial and subsequent batches of such cholesteric liquid crystal formulations. The formulations have a time-dependent, temperature-dependent limit in a pseudo-irreversible liquid crystal phase wherein when said limit is exceeded, the formulations exhibit a color change which is irreversible by cooling.

34 Claims, 4 Drawing Sheets

CHOLESTERIC LIQUID CRYSTAL FORMULATIONS AND TIME/TEMPERATURE MONITORING MEANS

This is a continuation-in-part application of Ser. No. 06/545,910, filed Oct. 27, 1983, now abandoned.

BACKGROUND OF THE INVENTION

1. Field of the Invention

This invention relates to indicators for time and temperature and methods for their preparation. More particularly, it relates to cholesteric liquid crystals capable of incorporation into indicator devices suitable for detecting limit-temperatures and/or limit-times. In addition methods are disclosed for reliably producing repeat batches of cholesteric liquid crystals.

2. Description of the Prior Art

Many physiologically active substances, such as blood and its components, biologicals, and blood replacements such as polymeric synthetic blood, degrade rapidly under ambient temperatures and must be stored under refrigeration or frozen prior to being used to minimize degradation. Warming to a temperature above a level predetermined as "safe" for each substance may cause degradation sufficient to prohibit the intended use of the substance. Such warming can occur if the cooling apparatus malfunctions, during shipment, or after the substance is removed from refrigeration for use.

Physiologically active substances, especially blood, are used in large quantities. They are commonly either frozen or refrigerated at about 1°-8° C. After they are removed from regulated cold storage, as in a blood bank, they may be transported to other locations for use, or possible use. The time in transit, in temporary refrigerated storage, or at room temperature, frequently extends for a number of hours before they are used or returned to regulated storage. One example of this storage problem is blood storage and handling. In order to safeguard against degradation of blood contained in medical blood bags, handling procedures are set up, which are to be followed by hospital personnel, and records of the time/transport of the transitory history of the blood bags are maintained.

There has been no means or method for continuously monitoring the temperature of blood and other physiologically active substances on a large scale, in such a manner as to record the occurrence of a temperature beyond acceptable limits and make the information known upon inspection at a later time. As a result, many substances are discarded after they have been removed from cold storage for a short period of time. Consequently, a great need exists for such means and/or method, which will insure that an acceptable temperature limit has not been exceeded, though a substance be removed from reliable refrigeration for an extended period of time. If it is known that the substance has not exceeded an acceptable temperature, in many cases the substance can be restocked in cold storage to be reissued (i.e., whole blood) and thus avoid disposing of expensive physiologically active substances.

Glass thermometers have been used to monitor the temperature of refrigerated physiologically active substances. To avoid contamination, direct contact between the thermometers and the substances should be avoided. Consequently, a thermometer typically is sandwiched between containers of a substance in transit. However, the temperature indicated by the thermometer fluctuates with the temperature of the substance, and the thermometer does not preserve an indication of the highest temperature reached. Consequently, the thermometer must be observed at relatively frequent intervals in order to provide some assurance that the substance has not exceeded its predetermined safe temperature.

Special glass thermometers are available having a "memory" feature: these thermometers after first being adjusted or set will indicate the highest temperature encountered by the thermometer after its adjustment or setting. The high reading is semipermanent, i.e., it is maintained until the thermometer is readjusted or reset. These special thermometers thus can reveal that the temperature of a monitored substance has exceeded a predetermined temperature even though the substance may be recooled after having exceeded the predetermined temperature. However, glass thermometers of either type are expensive, the special type being the more expensive. In addition, glass thermometers are relatively susceptible to breakage, giving rise to the hazards of broken glass including rupture and contamination of substances stored in thin plastic bags and, if the thermometer contains mercury, of toxic pollution.

Thermometric devices employing cholesteric liquid crystalline materials, referred to herein at times simply as "liquid crystals," heretofore have been employed for monitoring the temperature of stored physiologically active substances. These devices are inexpensive and not susceptible to breakage, but they do not have a memory feature. Therefore, these devices, like ordinary glass thermometers, must be observed at relatively frequent intervals to provide assurance that the substance has not exceeded its safe temperature.

Certain cholesteric liquid crystalline materials can be employed in memory-type thermometeric devices. These liquid crystals are of the type, disclosed in U.S. Pat. No. 3,594,126, which can form a metastable ordered glass under the appropriate conditions. The liquid crystal thermometeric devices can be manufactured to give an indication of whether a predetermined temperature or predetermined time at a specific temperature has been exceeded, and will maintain this indication until reset. The use of metastable ordered glass-forming liquid crystals to indicate thawing and exceeding of predetermined temperatures is disclosed in the foregoing patent and in U.S. Pat. No. 4,161,557. However, there was no appreciation or awareness of the pseudo-irreversible phase of the metastable ordered glass state of cholesteric liquid crystals, said phase being capable of monitoring multiple predetermined temperatures (limit-temperatures), all of such limit-temperatures being above the glass-transition temperature minimum. In fact, the '126 patent taught away from this discovery (column 2, lines 15-33). As far as is known to applicants, no such composition has been provided heretofore which has solved the problem of reliably producing a cholesteric liquid crystal capable of insuring that a physiologically active substance has not exceeded an acceptable temperature limit though removed from reliable refrigeration for an extended period of time.

OBJECTS OF THE INVENTION

An object of the invention is the utility of determining the glass-transition temperature range of each batch of each new or repeat formulation of a cholesteric liquid crystal suitable for incorporation into indicator devices capable of detecting temperature and/or time before exhibiting a color change. Another object of the invention is the use of the glass-transition temperature range as an indicator of when the cholesteric liquid crystal formulation's composition should be adjusted or the methods of indicator preparation should be modified to achieve desired indicator properties. Still another object of this invention are methods of formulating, incubating, quenching and utilizing indicator devices containing cholesteric liquid crystals capable of exhibiting reversible, and irreversible color changes that are suitable for use in detecting Limit-Temperatures and/or Limit-Temperature response times.

Yet another object of the invention is the reliable production of indicator devices containing cholesteric liquid crystals suitable for detecting and irreversibly indicating arrival at a Limit-Temperature and/or Limit-Temperature time period of a thermally sensitive composition of matter.

SUMMARY OF THE INVENTION

Figure 1:
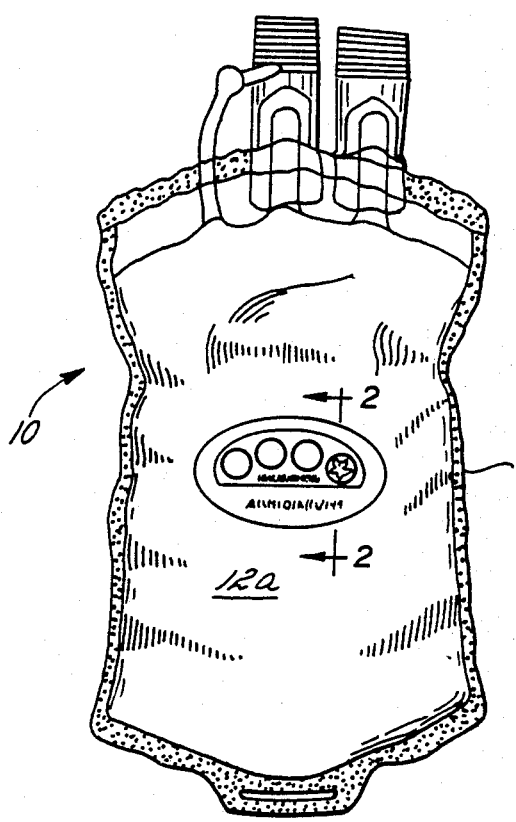
FIG. 1 is a plan view of a temperature-monitoring device affixed to a container of a physiologically active substance, in heat-transfer relation thereto, in accordance with a preferred embodiment of the invention.

The invention provides a method for reliably and reproducibly producing cholesteric liquid crystals capable of incorporation into indicator devices suitable for detecting a limit time and/or temperature for a temperature sensitive article.

The invention finds use in preparing an indicator suitable for detecting when an article has met or exceeded a thermokinetic limit. The thermokinetic limit is a function of both temperature (energy) and time (rate), resulting in a change in the suitability of the article for a useful purpose. First the article's thermokinetic limit must be determined. Next a cholesteric liquid crystal composition must be formulated that has a color-play temperature range, quenching color retention time, limit temperature color change, and limit-temperature response time suitable for detecting the exposure of the temperature sensitive article.

For each cholesteric liquid crystal formulation, the actual physical property known as the glass-transition temperature range must be determined. Measurement of this physical characteristic allows reliable replication of a liquid crystal formulation with the same temperature and time dependent properties.

Knowledge of the glass-transition temperature range also allows the reliable reproduction of known cholesteric liquid crystals having previously determined temperature and time dependent properties, such as color indicators. Another aspect of this invention allows the adjustment of the cholesteric liquid crystal formulation's composition to obtain the required glass-transition temperature range, thereby resulting in time and temperature properties equivalent to that of previous similar formulations of liquid crystals that differed only in the inherent properties of the raw materials incorporated, i.e., the raw materials are from different manufacturer lots or from different sources. In use the indicator devices containing the cholesteric liquid crystals are heated to a temperature at or above their color-play temperature range and quenched by quickly lowering the temperature below the color play temperature range to a point where the color characteristic of the color-play region is stabilized resulting in converting the physical state of the liquid crystals to either a pseudo-irreversible or an irreversible phase of the glass state.

Rapidly decreasing the temperature of certain cholesteric liquid crystals from a temperature at or above the color-play temperature range to a temperature below the glass-transition temperature range results in a change in the physical state of the liquid crystal formulation.

If said liquid crystal's temperature is decreased rapidly from a temperature in or just above the color-play temperature range to a temperature at or below the glass-transition temperature minimum, then the liquid crystal is in the irreversible phase of its glass state. On the other hand, if said liquid crystal's temperature is decreased rapidly from a temperature in or just above the color play temperature range to a temperature above the glass-transition temperature minimum up to the lower limit of the color-play temperature range, then the liquid crystal is in the pseudo-irreversible phase of its glass state. Another method of obtaining such pseudo-irreversible liquid crystal phases is to incubate a liquid crystal in its irreversible liquid crystal phase at a temperature between the glass-transition temperature minimum and the color-play temperature range.

A specific embodiment of this invention is the physical determination of the critical glass-transition temperature range. This may be accomplished by determining the heat capacity displacement using a differential scanning calorimeter. Alternatively, the glass-transition temperature range can be measured by determining changes in the volume expansion coefficient, the refractive index, stiffness, hardness, internal friction, dielectric constant, nuclear magnetic resonance spectrum, infrared spectrum, or the onset of brittleness, or onset of softening.

One embodiment of the invention is an indicator incorporating a cholesteric liquid crystal with a determined glass-transition temperature range that will exhibit a limit-time response at a constant temperature, or a limit-temperature response at a constant time period. Still another embodiment of the invention is a combination limit-time and limit-temperature response indicator. Here, the indicator color response is a product of variable temperatures and time periods and the resulting color response is evaluated by comparing the color to those of a standardized indicator scale characteristic of the particular cholesteric liquid crystal.

One embodiment of this invention also provides a very efficient, reliable solution to the problem of maintaining, in large-scale handling and usage, blood and other heat-sensitive physiologically active substances at acceptable temperatures, in a relatively simple and economical manner, which is easily learned by diverse individuals, who are responsible for the storage, issue, transportation, monitoring and use of such substances.

In particular, the invention provides a temperature-monitoring means and corresponding method based upon the use of visually observed cholesteric liquid crystalline materials or liquid crystals having memory characteristics (i.e., those liquid crystals capable of forming an ordered glass state), which temperature-monitoring means readily and rapidly may be activated for the purpose of indicating whether a predetermined limit-temperature has been exceeded, and which may be read correctly and reliably by various individuals responsible for the condition of a substance being monitored.

The invention obviates the need for frequent temperature checks. The deficiencies of the prior means and methods are overcome.

In preferred embodiments of the invention, a visual warning system based upon cholesteric liquid crystal material is combined with the memory-providing system, to alert personnel to impending increase in temperature to the predetermined limit, thereby enabling steps to be taken to safeguard a substance and preserve it in a desired state.

The invention also finds use in monitoring the temperatures of substances other than those active physiologically. Of special significance in this connection is a temperature-monitoring device embodying the foregoing instrumentalities, which device may be placed in heat-transfer relation to various objects.

More specifically, one aspect of the invention provides temperature-monitoring means for a heat-degradable physiologically active substance contained in a heat-conductive container and maintained at a holding temperature below a predetermined temperature for minimizing degradation thereof, the temperature-monitoring means being adapted to be placed in heat-transfer relation to the container at such holding temperature and comprising a cholesteric liquid crystalline material capable of existing at a temperature below its glass-transition temperature in a characteristic metastable ordered glass form exhibiting a color normally exhibited in its color-play temperature range. The material exists in the irreversible phase of its glassy state below the glass-transition temperature minimum and in the pseudo-irreversible phase above said minimum but below the color-play temperature range. When the properly activated temperature-monitoring means is placed in a heat-transfer relationship with a container, it exhibits an irreversible color change when the substance substantially reaches the predetermined limit-temperature upon warming, thereby providing a visual indication of whether the temperature of the substance has risen substantially to the predetermined temperature at any time after the temperature-monitoring means is placed in the heat-transfer relationship with the substance at the holding temperature.

Reference to a physiologically active substance herein contemplates a substance employed for medical and other purposes, particularly such as intended for parenteral administration to the body or for medical laboratory use. Substances with which the invention is employed in preferred embodiments include biologicals, blood components, and polymeric synthetic blood products. Biologicals are complex substances of organic origin useful in prevention, treatment or cure and/or diagnosis of disease, such as enzymes, globulin, serum, vaccines, antitoxins, and antigens. The blood components include plasma, serum, and other fractions, and reference to blood components is intended to encompass whole blood.

The invention further provides a temperature-monitoring device suitable for use in heat-transfer relation to an object at an initial temperature below a predetermined limit-temperature. This device visually indicates whether the object has reached the predetermined limit-temperature at any time after placing the device on the object and it gives a visual warning when the temperature of the object approaches the predetermined temperature.

This device comprises a first cholesteric liquid crystalline material capable of existing at a temperature below its color-play temperature range in a characteristic metastable ordered glass form exhibiting a color normally exhibited in its color-play temperature range. The color of the indicator changes, irreversibly below such range, upon warming to its limit-temperature, so that when the device is placed in such heat-transfer relation, it exhibits an irreversible color change when the object substantially reaches the predetermined limit-temperature. This irreversible color change provides a visual indication of whether the temperature of the object has risen substantially to the predetermined temperature at any time after the temperature-monitoring means is placed in a heat-transfer relationship with the object. The device also contains a second cholesteric liquid crystalline material which, when the device is placed in such heat-transfer relationship, exhibits a reversible color change within its color-play temperature range when the temperature of the object approaches the predetermined limit-temperature upon warming, thereby giving a visual warning of such approach.

DESCRIPTION OF THE PREFERRED EMBODIMENTS

DEFINITIONS

ACTIVATION is a process comprising first heating a liquid crystal formulation capable of forming a metastable ordered glass to a temperature in or just above its color-play temperature range and then quenching.

COLOR PLAY TEMPERATURE RANGE is the temperature range over which a cholesteric liquid crystal formulation in its mesomorphic state will exhibit a color when illuminated with non-polarized white light.

GLASS-TRANSITION TEMPERATURE ($T_g$) is the temperature at which the long chain molecules of a glassy material become free to rotate about their valence bonds, but do not become entirely free from mutual restraint, in which case the glass would melt. The glass-transition temperature is manifested as a change in slope when any of the primary thermodynamic properties of the glass (such as volume, heat content, index of refraction, etc.) are plotted against temperature (1,2). Since multiple transitions may occur, produced by the motion of short sections of the main chain or of side chains of the glass molecule, it has been proposed that the transition of highest temperature be called $T_g(3)$, and it will be so called in this document. [This is also consistent with the commonly accepted definition of melting point, $T_m$, which is the highest temperature of the melting point range (the temperatures at which the sample first begins to melt and is totally melted). (4)].

(1) U.S. Pat. No. 3,594,126, James L. Fergason and Newton N. Goldberg. 1971. "Temperature-Limit Detection".
(2) Fred W. Billmeyer, Jr. 1965. "Textbook of Polymer Science", Interscience Publishers division of John Wiley and Sons, New York, N.Y., pp. 198-200.
(3) ibid, pp. 203-204.
(4) John A. Landgrebe. 1977. "Theory and Practice in the Organic Laboratory", 2nd Ed., D. C. Heath and Company, Lexington, Mass., p. 21.

GLASS TRANSITION TEMPERATURE MINIMUM ($T_g$ MIN) is the lowest temperature of the glass-transition temperature range.

GLASS-TRANSITION TEMPERATURE RANGE ($T_g$ range) is the temperatures at which the first glass-transition and the last glass-transition occur, as manifested by changes in slope when any of the primary thermodynamic properties of the glass are plotted against temperature. (This is analogous to the melting point range).

IRREVERSIBLE COLOR CHANGE is a distinctive, "permanent" color change exhibited by an activated liquid crystal formulation in its pseudo-irreversible phase in response to time and/or temperature changes. The change is considered "permanent" because the color of the formulation cannot be restored to its original condition without reactivating or warming to the color-play temperature range.

IRREVERSIBLE INDICATOR is a device comprising a cholesteric liquid crystal in its pseudo-irreversible phase and which is capable of exhibiting an irreversible color change.

IRREVERSIBLE LIQUID CRYSTAL PHASE is a phase of the metastable ordered glass state of cholesteric liquid crystal formulations after they have been activated and held at or below their glass-transition temperature minimum. Liquid crystals in this phase exhibit a color normally exhibited in their color-play temperature range, the color of the material irreversibly changing, upon warming to a temperature above their glass-transition temperature minimum. While in their irreversible phase, these formulations will retain their quenching color indefinitely (at least for one year or more).

LIMIT-TEMPERATURE is the temperature at which a cholesteric liquid crystal formulation in its pseudo-irreversible phase exhibits a color change from its color at the time of quenching to a different distinctive color. The limit-temperature is a thermokinetic response resulting from both the time and temperature conditions experienced by the cholesteric liquid crystal since quenching.

LIMIT-TEMPERATURE RESPONSE TIME is the time required for a cholesteric liquid crystal formulation in its pseudo-irreversible phase incubated at a limit-temperature to exhibit a color change from its color at the time of quenching to a different distinctive color. When expressing a limit-temperature response time, it is essential that the limit-temperature be specified, since the response time is a function of the incubation temperature.

MESOPHASE TEMPERATURE RANGE is the temperature range over which a cholesteric liquid crystal formulation is in its mesomorphic state (mesophase; cholesteric and smectic phases), a state of matter intermediate in molecular ordering between its crystalline solid and its ordinary liquid (isotropic liquid). Some cholesteric liquid crystal formulations, those which are polymesomorphic, have more than one mesomorphic phase, i.e., one or more cholesteric phase(s) and/or one or more smectic phase(s).

PSEUDO IRREVERSIBLE LIQUID CRYSTAL PHASE is a phase of the metastable ordered glass state of cholesteric liquid crystal formulations after they have been activated and after they have been exposed to a temperature above their glass-transition temperature minimum but below their color-play temperature range. Liquid crystals in this phase exhibit a color normally exhibited in their color-play temperature range. In this phase, liquid crystal formulations will retain their quenching color for a definite, relatively short period, generally less than one year.

QUENCHING is a process of fast-cooling, generally at a rate of 10° C. per minute or faster, a cholesteric liquid crystal formulation from a first temperature in or just above its color-play temperature range to a second temperature sufficiently below its color-play temperature range that a color normally exhibited only in the color-play temperature range is retained at the second temperature.

QUENCHING COLOR RETENTION TIME is the time for which the color exhibited at the time of quenching of a cholesteric liquid crystal formulation is retained at a specific temperature above the glass-transition temperature minimum but below the color-play temperature range. When expressing a quenching color retention time, it is essential that the incubation temperature or temperatures be specified, since the retention time is a function of the incubation temperature.

THERMOKINETIC relates to changes in a process or a system which are dependent on both energy levels, e.g., temperature, and time.

Glass-Transition Determination

Previously, the limit-temperature for a liquid crystal in its irreversible phase was described to be equivalent to the qlass-transition temperature minimum. Surprisingly, when liquid crystals are in their pseudo-irreversible phase, multiple limit temperatures are possible, all of which are above the $T_g$ min as actually measured by physical methods. Furthermore, the glass-transition temperature range can be used to standardize and to characterize the formulation of cholesteric liquid crystals. Quite unexpectedly, the determined glass-transition temperature range predicts whether a particular batch of cholesteric liquid crystals will exhibit performance characteristics equivalent to that of an earlier batch.

Therefore, the determination of the glass-transition temperature range permitted the reproduction of a particular formulation of cholesteric liquid crystals with equivalent performance characteristics. This determination is particularly important because of the currently uncontrollable variation in properties inherent in the biologically derived cholesteric starting materials used to formulate cholesteric liquid crystals. Previously, unexplained variations in performance characteristics had occurred between batches of cholesteric liquid crystals that had been formulated in an apparently identical manner. The differences were due to different batches of starting cholesteric materials. With each batch of a particular cholesteric liquid crystal formulation, the glass-transition temperature range is determined to assure that it will function as desired. If the glass-transition temperature range differs, then the formulation can be adjusted slightly to achieve the correct glass-transition temperature range for a particular batch of cholesteric liquid crystals. Such adjustments include variation in the quantities of the cholesteric ingredients in the formulation and other similar materials known in the art to be compatible with liquid crystal indicators. The critical determinate is that the glass-transition temperature range of each batch be equivalent.

A cholesteric liquid crystal is said to have known thermokinetic properties when the glass-transition temperature range is known, thereby resulting in a liquid crystal having a reproducible limit-temperature and limit-temperature response time. Such knowledge of the glass-transition temperature range also determines the post-quenching temperature boundary between irreversible and pseudo-irreversible cholesteric liquid crystal phases.

One aspect of this invention provides an indicator device to detect the occurrence of a temperature rise in a substance or object to some predetermined limit-temperature for the substance or object. In the indicator, use is made of the ability of metastable ordered glass-forming cholesteric liquid crystalline materials to produce an irreversible color change at temperatures above their glass-transition temperature minimum but below the color-play temperature range.

Liquid Crystal Formulations

Cholesteric liquid crystalline materials, also referred to as cholesteric liquid crystals, are a class of compounds that display a color-play while in their cholesteric mesophase or cholesteric mesomorphic state. The compounds, some of their properties and some of their uses, are described in above-identified U.S. Pat. No. 4,161,557 and in the references cited therein, among others. The liquid crystals in the color-play temperature range reflect light, the dominant wave length of which is affected by stimuli applied to the liquid crystals, such as heat, physical stress, electricity, magnetism, and radiation, which are types of applied energy, the presence of other materials, which may be present as contaminants, and materials present in the environment and which act upon the liquid crystals.

An important property of the individual cholesteric liquid crystalline materials and of mixtures of different materials is that, all other conditions being equal, they display the same color at a specific temperature. The characteristic color is changed by the application of one of the above-described stimuli, furnishing a direct, visible response which may be utilized in a detector system. A stimulus either can interact directly with the liquid crystals, or can be converted into a stimulus which does interact. The color responses to stimuli are utilized in systems for measuring and/or detecting specific temperatures and temperature changes, detecting radiation, measuring stress, monitoring the presence of gases and vapors, and other purposes.

Reversible And Irreversible Indicators

The temperature sensitivity of the liquid crystals finds important use in thermometers and thermographic systems. In general, when viewed against a black absorptive background color, the liquid crystals change in color from red to green to blue to violet with increasing temperature in the color-play temperature range, and the reverse color change takes place with decreasing temperature therein. Above and below the color-play temperature range, the liquid crystals assume the color of the background.

| Summary Of The Characteristics Of The Pseudo-Irreversible And Irreversible Phases Of Metastable Ordered Cholesteric Liquid Crystal Glasses | |
|---|---|
| Pseudo-Irreversible Phase | Irreversible Phase |
| Intermediate phase between irreversible phase and reversible phase of the cholesteric liquid crystal state | Distinct phase of the cholesteric liquid crystal state |
| Produced by activating and quenching a cholesteric liquid crystal formulation to a temperature above its glass-transition temperature minimum but below its color-play temperature range or by activating and quenching the formulation to a temperature below its glass-transition temperature minimum and then incubating it at a temperature above its glass-transition temperature minimum but below its color-play temperature range | Produced by activating and quenching a cholesteric liquid crystal formulation to a temperature at or below its glass-transition temperature minimum |
| Multiple limit-temperatures above the glass-transition temperature minimum but below the color-play temperature range of the formulation are possible. | The glass-transition temperature minimum is the only possible limit-temperature |
| The quenching color retention time is totally dependent on both time and temperature and is relatively short | The quenching color retention time is substantially independent of temperature and time at any temperature at or below the glass-transition temperature minimum and is indefinite (at least one year or longer) |

Certain cholesteric liquid crystalline materials produce a metastable, ordered glass when fast-cooled from a first temperature in or just above the color-play temperature range, to a second temperature (1) below the glass-transition temperature minimum; or (2) above the glass-transition temperature minimum but below the color-play temperature range. Upon cooling such cholesteric liquid crystalline materials to a second temperature below the first temperature, the liquid crystalline materials initially retain a color which is characteristic of the liquid crystal when at the first temperature; however, when warmed from the second temperature to a higher third temperature, these liquid crystals exhibit a color change which is irreversible, thereby visually indicating the occurrence of such warming. For example, blood in a container at 2° C. has a liquid crystal indicator device applied which is quenched from a temperature in or just above the color-play temperature range to 2° C. resulting in a pseudo-irreversible phase and having a deep royal blue color. If the blood stays below 10° C., the indicator stays dark royal blue. If it is allowed to warm above 10° C. for a short time, the blue color fades. If the blood with the non-blue indicator is again cooled to 2° C. after the warming to 10° C. or above, the blue color does not return and this acts as in indication the blood may no longer be suitable for particular uses.

The individual liquid crystals which function to produce the foregoing results act as viscosity-increasing agents when employed in a mixture of liquid crystalline materials, and they act to retard the rate of color change. Such agents include the dicholesteryl esters of saturated and unsaturated alpha, omega-dicarboxylic acids containing 2-27 carbon atoms and cholesteryl p-nonylphenyl carbonate, as disclosed in the foregoing patent, and other liquid crystals, including cholesteryl cinnamate, cholesteryl allyl carbonate, cholesteryl benzoate, and dicholesteryl carbonate.

In preferred embodiments of the invention, the metastable ordered glass-forming liquid crystal composition includes either cholesteryl benzoate or dicholesteryl carbonate, and preferably both, for maximizing the length of time the composition will remain in the ordered glass state, as referred to hereinafter. It is further preferred that the composition additionally include cholesteryl p-nonylphenyl carbonate. Still further preferred compositions include, in addition to the foregoing components, cholesteryl nonanoate.

A liquid crystal composition is placed in its ordered glass form by first warming it to a temperature at which it displays a color typical of its color-play temperature range, which temperature may be any temperature in the color-play temperature range. The liquid crystal then is rapidly cooled to a temperature below its glass-transition temperature minimum to form an irreversible phase, or above the glass-transition temperature minimum but below the color-play temperature range to form a pseudo-irreversible phase. This metastable ordered glass exhibits a color corresponding to a color exhibited at the time of quenching. It is preferred to warm the liquid crystal composition first to a temperature 0.5°-5° C., more preferably 1°-2° C., higher than the highest temperature of the color play temperature range of the composition, and, allowing the composition to cool, and to initiate the rapid cooling at 10° C. per minute or greater as the color of the composition just changes to the desired color preferably from black to violet or deep royal blue, with falling temperature.

The length of time the composition will remain in its ordered glass state depends upon the temperature. If maintained below its glass-transition temperature minimum, it will last indefinitely (at least 1 year) and is considered to be in its irreversible phase. If it is maintained above its glass-transition temperature minimum but below the color-play temperature range, it is in its pseudo-irreversible phase.

Cholesteric Liquid Composition Adjustment For Irreversible Indicators

One empirical method for adjusting the composition of subsequent lots of cholesteric liquid crystals to achieve a glass-transition temperature range characteristic of a previous lot is as follows:
  to increase the temperature of the glass-transition temperature range, the amount of the viscosity increasing agent (which acts to retard the rate of color change) in the formulation is increased.
  to decrease the temperature of the glass-temperature range, the amount of the viscosity increasing agent (which acts to retard the rate of color change) in the formulation is decreased.

The reformulated lot of cholesteric liquid crystals containing an increased or decreased amount of viscosity increasing agent is then subjected to a glass-transition temperature range measurement. If the glass-transition temperature range of the reformulated lot is characteristic of the desired previous lot, it is used to produce the irreversible indicator. If the glass-transition temperature range is not characteristic of said desired previous lot, the amount of viscosity increasing agent is further modified empirically and the glass-transition temperature range of the formulation is measured, until a composition having the desired glass-transition temperature range is obtained.

In general, viscosity increasing agents will reduce the color play temperature range of a formulation. In some cases the color play temperature range may be lowered to an unacceptable range. This occurrence may preclude the use of some lots of raw liquid crystals in the formulation of irreversible indicators. Those skilled in the art will also realize that if the viscosity increasing agent has no color play temperature range of its own, increasing its concentration in a formulation will reduce the color intensity of the formulation.

Indicator Selection

The conditions under which the temperature of a substance or object is monitored are difficult to analyze precisely. Therefore, the selection of a liquid crystal composition suitable for recording the attainment of a predetermined limit-temperature in the substance or object preferably is performed empirically or operationally. Thus, in a preferred procedure, liquid crystal compositions are selected, on the basis of information in the literature or obtained from experimentation, selecting those desirable color change properties. Critical for the reproducibility of the cholesteric liquid crystals is the determination of the glass-transition temperature range for each batch of formulated liquid crystals. These liquid crystal compositions are applied to a container for the substance or to another object, in the form of devices or tags, to determine empirically the liquid crystal composition or compositions which undergoes or undergo a color change when the substance or object reaches the predetermined temperature and within a preselected time period. The specific color change to be used as an indicator of the predetermined temperature is selected in accordance with observed results.

Performance Standards

Certain medical products have storage and/or usage temperature requirements established by government regulatory agencies or private trade associations. The performance standards for cholesteric liquid crystal monitoring devices for these products could be greatly improved by incorporation of the glass-transition temperature range as a critical physical parameter for establishing the suitability of repeat batches of cholesteric liquid crystals for a particular indicator function. The following illustrates one such performance standard used for HemoTemp ® II blood bag monitors.

In the manufacture of irreversible blood bag monitor, the liquid crystal composition changes somewhat from one lot of finished product to another, depending on the purity and performance characteristics of the specific lots of starting raw materials. Thus, the liquid crystal mixture is formulated to meet performance standards specified in the "Master Device Record" ("MDR"), which is maintained to comply with FDA regulations for medical devices. The current standards for the liquid crystal in its pseudo-irreversible phase, established to insure that the product performs as desired, are as follows:

1. Water Bath Ramp Test. The activated ELC shall change from blue to a non-blue color at 14°±3° C. surface temperature in a maximum time of one hour when quenched at 3.5° C. in a water bath, and when warmed at a rate of not more than 0.5° C./minute after quenching.
2. Static Bag Test. The activated ELC shall turn from blue to a non-blue color at 10°±2° C. internal temperature when quenched on a blood bag initially at 2°-3° C. and placed in a room temperature environment (20°-25° C.) to warm.
3. Refrigerator Test. The activated ELC will remain a blue color when stored at 2° C. for at least a 48 hour period.

Compositions contemplated for use are tested for retention of their pseudo-irreversible or irreversible phase, by incubation at appropriate temperatures after being placed in that state. Compositions for use in monitoring blood bag temperatures are incubated at 2° C. in testing. It is desirable that the initial color be maintained for up to about 24 hours, which is related to the period of time for which the bags may be out of the blood bank prior to use. Compositions being tested for other uses may be stored at other temperatures.

Color Indicating Properties

Preferred liquid crystal compositions which may be employed in accordance with the invention to indicate that a predetermined temperature has been reached are set forth in Table I, together with their red to blue color-play temperature ranges, experimentally-determined limit-temperatures, and color retention time at 2° C. The limit-temperatures are the temperatures at which the specified color changes take place, as determined by the following screening test. The color retention time is the time period over which a composition remains in its ordered glass state exhibiting a color. The relatively short quenching color retention time of composition numbers 1 to 5 at 2° C. limit their utility to lower temperature use, in general.

In a screening procedure for experimentally determining limit temperatures and limit-temperature response times of ordered glass-forming liquid crystal compositions, used when the limit-temperatures are above 0° C., a test tag containing a composition in its color-play temperature range was affixed to an aluminum platform. The platform was immersed in a bath containing a circulating coolant consisting of equal volumes of water and isopropanol, at 0° C. In this manner, the composition was rapidly cooled to a temperature resulting in either an irreversible or pseudo-irreversible phase of the ordered glass state. The coolant was warmed at a rate of 0.2° C. per minute, while the temperature of the surface of the block was measured by a thermistor probe in contact therewith. The block temperatures measured and the colors exhibited by the composition at 60-second intervals were recorded. As the coolant was warmed, the color of the composition changes from its original color at some point. Preferably, the original color is dark royal blue against a black background, obtained by fast-cooling the composition from its color-play temperature range while exhibiting that color. Continued warming causes the composition to go through a succession of color changes, over a range of temperatures, until the composition exhibits the background color, which is black. The temperature range of the color change, determined in this manner, served as an indication of the temperatures of a substance or object which will produce a color change in the composition.

Liquid crystal compositions of interest for the intended use, on the basis of the screening test, are further evaluated by employing them in a temperature-monitoring device, such as made in accordance with the present invention, under conditions approximating or simulating those found in use. Thus, for example, when the intended use is for monitoring blood temperatures, a Fenwal "Blood-Pack"-type blood bag, exposed to room temperature, which may be about 22°-27° C., is connected to a source of circulating cold water. A thermistor probe is centered inside the bag, for measuring the core temperature of its contents. Another probe is attached to and measures the temperature of the outer surface of the bag. Cold water is circulated through the bag until its contents stabilize at a core temperature of 2° C.

The monitoring device with the liquid crystal composition in its color-play temperature range then is affixed to the outer surface of the bag, causing the liquid crystal composition to be rapidly cooled to the pseudo-irreversible phase of its ordered glass state. The circulation of water then is discontinued, and the inlet and outlet ports of the bag are closed off. The bag is allowed to warm to the ambient room temperature. The approximate time of warming to a core temperature of about 10° C. is 20–30 minutes at an ambient temperature of about 26.5° C. The core temperature, the bag surface temperature, and the color of the liquid crystal composition are observed at one-minute intervals and recorded. The color of the composition at a predetermined core temperature serves as the first signal that such temperature has been reached or exceeded. Succeeding colors, the last of which is black, signal higher temperatures.

TABLE 1(A)

| Composition No. | [1]Cholesteric Liquid Crystal Composition, Parts By Weight | | | | | | ELC Red to Blue Color-play Temp. Range °C. |
|---|---|---|---|---|---|---|---|
| | CNPC | OCC | CN | CBZ | CCL | DCC | |
| 1 | 40.0 | — | 40.0 | 10.0 | 10.0 | — | 35.4–37.2 |
| 2 | 40.0 | — | 46.0 | 7.0 | 7.0 | — | 35.2–36.7 |
| 3 | 30.0 | — | 46.8 | 17.4 | 5.8 | — | 36.0–38.8 |
| 4 | 30.0 | — | 45.0 | — | 10.0 | 15.0 | 21.8–26.1 |
| 5 | 34.0 | 8.0 | 42.0 | 8.0 | 8.0 | — | 25.4–28.9 |
| 6 | 28.9 | — | 36.8 | 15.1 | — | 19.2 | 26.7–32.5 |
| 7 | 35.0 | — | 37.0 | 13.0 | — | 15.0 | 32.7–37.1 |

TABLE 1 (B)

| Composition No. | Preferred Initial Warming Temperature °C. | Color Change Temp., °C., At Start Of: | | | [4]Color Retention Time at 2° C., Hours |
|---|---|---|---|---|---|
| | | [2]1st Color Change | [3]Signal Color | Black | |
| 1 | 38.5 | 3.2 | — | 9.8 | 1.0 |
| 2 | 38.0 | 0.8 | — | 8.6 | 0.5 |
| 3 | 40.0 | 1.2 | — | 8.2 | 0.25 |

TABLE 1 (B)-continued

| Composition No. | Preferred Initial Warming Temperature °C. | Color Change Temp., °C., At Start Of: | | | [4]Color Retention Time at 2° C., Hours |
| --- | --- | --- | --- | --- | --- |
| | | [2]1st Color Change | [3]Signal Color | Black | |
| 4 | 27.5 | 4.8 | — | 15.5 | 5.5 |
| 5 | 30.0 | 1.0 | — | 8.4 | 1.0 |
| 6 | 34.0 | 7.4 | 13.0 (GREY) | 23.7 | 96.0 |
| 7 | 36.5 | 5.5 | — | 18.3 | 28.0 |

[1]The abbreviations used are: CNPC = cholesteryl p-nonylphenyl carbonate, OCC = cholesteryl oleyl carbonate, CN = cholesteryl nonanoate, CBZ = cholesteryl benzoate, CCL = cholesteryl chloride, DCC = dicholesteryl carbonate.
[2]Light blue in each instance.
[3]Color selected to indicate that a predetermined temperature has been exceeded.
[4]Time to first appearance of black color.

In further preferred embodiments of the invention, a second cholesteric liquid crystalline material is provided in association with the ordered glass-forming liquid crystalline material, to give a visual warning when the temperature being monitored approaches the predetermined limit-temperature. The second liquid crystal material exhibits a reversible color change in its color-play temperature range when the temperature being monitored approaches the predetermined limit-temperature. Thus, when the second material exhibits a color characteristic of its color-play temperature range, an observer is warned that the temperature is approaching the limit-temperature, and may take steps to ensure that the latter temperature is not reached. It is preferred that the two materials be relatively closely adjacent to each other, for determining the temperature in the same area, and so that both materials may be viewed at a glance. Additional cholesteric liquid crystalline materials, having other color-play temperature ranges, may be provided for indicating other temperatures below the predetermined limit-temperature.

Table 2 sets forth three liquid crystal compositions suitable for use in monitoring the temperature of blood contained in a blood bag, over the core temperature range of 1°–9° C.

TABLE 2

| Composition No. | Cholesteric Liquid Crystal Composition, Parts By Weight | | | Temperature, °C., At Start Of: | | |
| --- | --- | --- | --- | --- | --- | --- |
| | CN | OCC | CCL | Red Color | Green Color | Blue Color |
| 1 | 37.8 | 50.2 | 12.0 | 4.2 | 5.1 | 6.1 |
| 2 | 48.7 | 40.1 | 11.2 | 6.7 | 7.6 | 8.9 |
| 3 | 55.4 | 33.4 | 11.2 | 10.1 | 11.1 | 12.3 |

[1]The abbreviations used are: OCC = cholesteryl oleyl carbonate, CN = cholesteryl nonanoate, CCL = cholesteryl chloride.

The compositions of Table 2, like the ordered glass-forming liquid crystals, are placed in heat-transfer relationship to the outer surface of a blood bag. The color-play temperature ranges of compositions 1, 2 and 3 were empirically selected to indicate bag content core temperatures in the respective ranges of 1°–3° C., 4°–6° C. and 7°–9° C. The determination of the appropriate liquid crystal color-play temperature ranges is carried out by a simulated blood bag use test, similar to that described hereinabove. Other compositions may be selected for indicating the same or different temperatures or temperature ranges. Different color-play temperature ranges may be selected for other uses embodying other predetermined temperatures.

Liquid crystals must be protected or shielded from the atmosphere, unless they are used only for a relatively short period of time. Exposure to the atmosphere can result in oxidation, causing the liquid crystals to deteriorate. Foreign particles from the atmosphere provide sites for crystallization and alter the delicately balanced mesomorphic texture of the liquid crystals. Ultraviolet radiation may cause deterioration of the liquid crystals.

For protection against such exposure, protection against physical contacts, cleanliness, convenience in handling, and other reasons, liquid crystals in the past have been enclosed in various ways. In the present invention, it is preferred that the liquid crystals be dispersed in a film-forming polymer matrix. It is further preferred that they be micro-encapsulated, and that the capsules be dispersed in the matrix. Encapsulation materials include gelatin-gum arabic, polyvinyl alcohol, zein, or other substances, which are dispersed in film-forming polymers, as disclosed in U.S. Pat. Nos. 3,585,381 and 3,697,297. A mixture of pigskin gelatin and gum arabic is the preferred capsule material, and the capsules preferably are dispersed in a matrix of polyvinyl alcohol.

Alternatively, the liquid crystals may be dispersed in the matrix in the form of finely divided naked aggregates. The dispersion may be produced by drying an emulsion of the liquid crystals in an aqueous solution of a polymer such as polyvinyl alcohol or a polyacrylate, as disclosed in British Pat. No. 1,161,039, published Aug. 13, 1969, and U.S. Pat. No. 3,600,060, or by forming an organic solvent solution of a polymer and the liquid crystals, and removing the solvent to form a film or layer, suitable polymers including polyvinyl butyral, acrylic resin, styrene resins, polyester resins, epoxy resins, polyvinyl chloride, polyvinyl acetate, and polycarbonate, as disclosed in U.S. Pat. No. 3,620,889, and polyurethane, as disclosed in U.S. Pat. No. 3,872,050. The aforementioned U.S. Pat. No. 4,161,557 discloses an improvement in the manufacture of a polyvinyl butyral film having liquid crystals dispersed therein.

A temperature-monitoring device in accordance with the invention preferably includes a support or base, which carries the liquid crystal compositions in a permanent assembly. The support is affixed to an object the temperature of which is to be monitored. The support preferable is a film or strip of plastic material, further preferably polyethylene terephthalate (Mylar®), which also serves as a protective layer for the liquid crystals. It is further preferred to provide means, such as an adhesive, for securing the liquid crystal compositions to the object.

More specifically, a preferred monitoring device has substantially flat inner and outer surfaces, and includes a self-supporting clear, transparent supportive and protective outer film carrying the first and second liquid crystal compositions on its inner surface, and an inner layer of adhesive serving to place the device in intimate heat-conductive relation to an object.

Blood Bag Indicator

Figure 2:
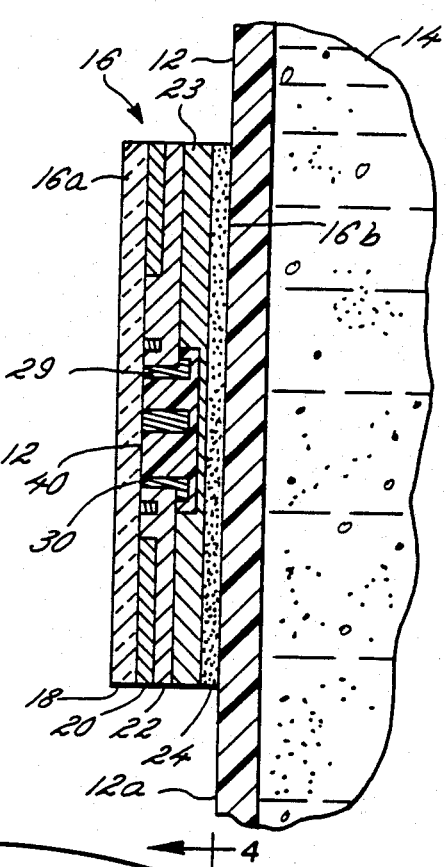
FIG. 2 is an enlarged fragmentary cross-sectional view, partly schematic, of the embodiment of FIG. 1, taken substantially on line 2—2 thereof.
Figure 4:
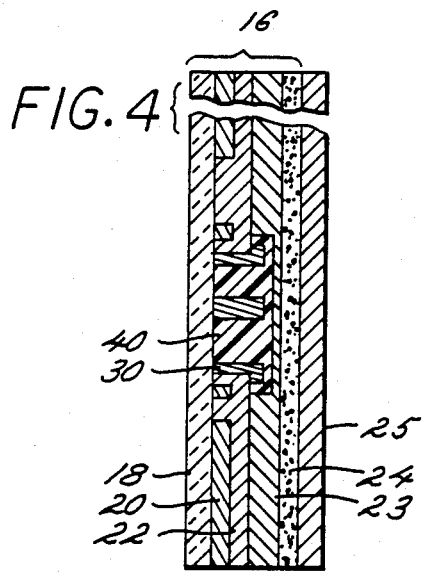
FIGS. 4 and 5 are enlarged schematic cross-sectional views of the device of FIG. 3, respectively taken substantially on lines 4—4 and 5—5 thereof.
Figure 5:
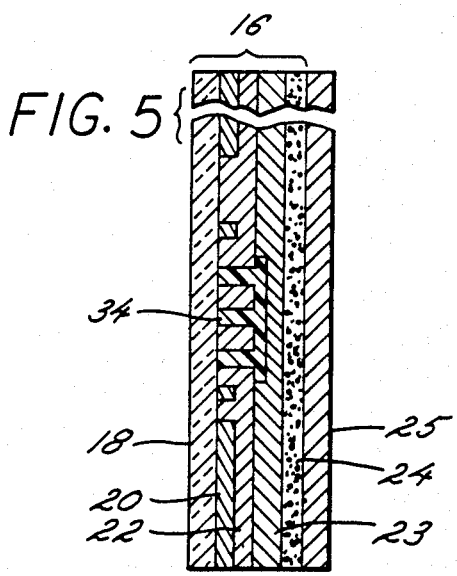

FIGS. 1 and 2 illustrate a combination 10 of a container 12 and a physiologically active substance 14, in accordance with a preferred embodiment of the invention. The container 12 constitutes a conventional medical blood bag, holding whole human blood as the substance 14, maintained at a core temperature of from about 1° C. to a desired maximum below about 10° C. A temperature-monitoring device 16 of the invention in the form of a tag or label is adhered to the outer surface 12a of the bag 12, in intimate heat-conductive relation thereto. The device 16 has substantially flat outer and inner surfaces 16a and 16b, respectively. It includes a self-supporting clear transparent outer film or layer 18 preferably of polyethylene terephthalate (Mylar ®), about 3 mils thick. A graphic layer 20 of white ink overlies the inner surface of the film 18. A graphic layer 22 of blue or blue-violet ink overlies the inner surface of the white ink layer 20. A background layer 23 of black ink overlies the inner surface of the blue layer 22. A layer 24 of pressure-sensitive adhesive overlies the inner surface of the black layer 23. The adhesive layer 24 adheres the device 16 to the outer surface 12a and the bag 12. Prior to use, a release sheet 25 (FIGS. 4 and 5) is adhered to the adhesive layer 24 thereover.

Figure 3:
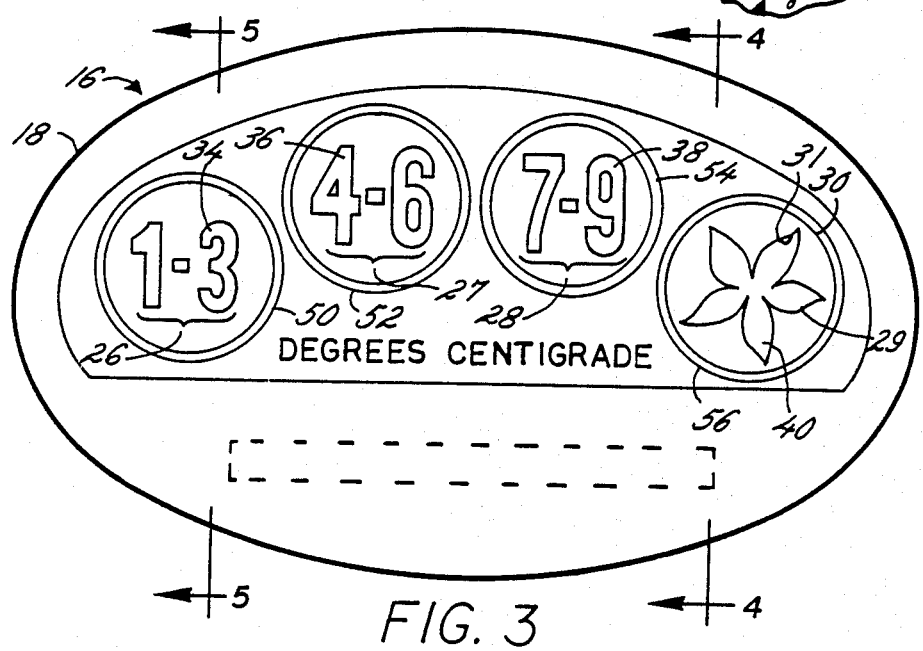
FIG. 3 is an enlarged plan view of the temperature-monitoring device illustrated in FIG. 1.

Referring particularly to FIG. 3, registering windows or openings are provided in the white layer 20 and blue layer 22, to define four viewing areas 26, 27, 28 and 29. The respective viewing areas 26, 27, and 28 are in the shape of the numerical indicia 1-3, 4-6, and 7-9. The viewing area 29 encloses a central portion of a second layer 30 of black ink, which also overlies the blue layer 22 around the area 29. A centrally-disposed flower- or star-shaped window or opening 31 is provided in the second black ink layer 30.

Reversible temperature indicators 34, 36, and 38 are provided in the viewing areas 26, 27, and 28, respectively. The reversible indicators 34, 36, and 38 are composed of liquid crystal compositions Nos. 1, 2, and 3, respectively, of Table 2, each dispersed in a film-forming polymer matrix, as described hereinafter. An irreversible temperature indicator 40 is provided in the viewing area 29, and it is composed of liquid crystal composition No. 6 of Table I, dispersed in a film-forming matrix. This cholesteric liquid crystal indicator is actually used in its pseudo-irreversible phase; however, the resulting color-change is irreversible. The indicators 34, 36, 38, and 40 are visible through the transparent film 18, and the black ink layer 23 provides a black background for them. The second black ink layer 30 also surrounds a visible portion of the irreversible indicator 40, in the flower-shaped window 31. The reversible indicators 34, 36, and 38 serve to indicate current temperatures, while the irreversible indicator 40 serves to indicate that the predetermined temperature has been reached, either in the past or currently.

The inks used to manufacture the device 16 are selected for their inertness to or non-interaction with the liquid crystal compositions of the indicators 34, 36, 38, and 40, for being printable upon the film 18, and, with the blue and black inks, for enhancing the color display of the indicators. In particular, liquid crystals are adversely affected by aromatic solvents, and by lower molecular weight compounds containing, among other functional groups, ketone, halogen, carboxylic acid, or basic amine groups, or conjugated unsaturation, which, therefore, are avoided.

An ink is evaluated for possible use in the device 16 by making a test piece by the procedure described herein for the manufacture of the device. The color-play temperature range and color display characteristics for the reversible and the irreversible indicators, and the ordered glass characteristics of the irreversible indicator, are observed and measured over a period of time. If any of these characteristics vary from standard values, the ink is rejected.

Printability, or adherence, to the film 18 is tested by determining whether the ink layer is lifted from the film surface by a pressure-sensitive tape adhered to the ink layer and peeled therefrom. The color of a blue ink is visually selected to minimize contrast with the violet end of a liquid crystal color display. A black ink is visually selected to be opaque and highly light absorbent.

In use, the release sheet 25 is removed, and the device 16 is warmed to a temperature above the color-play temperature range of the liquid crystal composition in the irreversible temperature indicator 40, which is composition No. 6 of Table I in the illustrative embodiment, having a preferred warming temperature of 34° C. The device 16 may be warmed by means such as immersion in heated water, or exposure to heated air from a hot air blower. The indicator 40 goes through its color-play temperature range color display to a black color.

The device 16 then is brought into proximity to a blood bag which contains blood at its storage temperature. The color of the irreversible indicator 40 is observed, and when it changes from black to violet, as the liquid crystal composition cools into its color-play temperature range, the device 16 is firmly pressed against the bag 12, to affix it to the bag. The device 16, and particularly the irreversible indicator 40, is quenched by rapid cooling due to heat transfer to the cold bag, thereby placing the liquid crystal composition of the indicator 40 in the pseudo-irreversible phase of its metastable ordered glass state. The color of the ordered glass is dark royal blue, due to a slight cooling of the indicator 40 occurring just prior to the formation of the ordered glass state by the rapid cooling.

The reversible indicators 34, 36, and 38, provide visual indications of the temperature of the blood 14 when the temperature is in the range of 1°-3° C., 4°-6° C., and 7°-9° C., respectively. With the blood at a storage temperature of 2° C., the indicator 34 for the range 1°-3° C. will display a color, indicating that the blood temperature is in that range, as described more specifically hereinafter.

Typically, the temperature-monitoring device 16 is applied to the bag 12 when the bag is removed, or it is anticipated that the bag is to be removed from the blood bank refrigerator. Such removal occurs when blood is to be transported from a blood bank to an operating room, or from one blood bank to another, and when samples of blood are required for cross-matching to the blood of a patient. The blood may be removed from the blood bank and in transit or temporarily stored in a refrigerator near the operating room for up to a number of hours.

During the time the bag 12 is removed from the blood bank, the blood temperature may be checked by observing the reversible indicators 34, 36, and 38. The indicator 38, having a temperature range of 7°–9° C., indicates that the temperature of the blood is approaching the predetermined temperature of 10° C., to warn an observer, who may take steps to prevent the temperature thereof from reaching 10° C. With respect to each of the temperature ranges indicated by the reversible indicators 34, 36, and 38, displays of tan, green, and blue colors indicate temperatures at the lower end, middle, and higher end of the range, respectively.

A change in color of the irreversible indicator 40 from its dark royal blue color to a non-blue color indicates that the blood 14 in the bag 12 has reached a temperature of substantially 10° C. As the blood warms further, the color of the indicator 40 goes through a succession of shades, finally becoming black. The color change of the indicator 40 is irreversible, in the sense that the dark royal blue color of the pseudo-irreversible phase of the ordered glass state thereof cannot be regained merely be re-cooling the bag 12 with the adhered device 16 to a temperature below 10° C. Thus, the device 16 evidences excessive warming followed by recooling of a blood bag when the irreversible indicator 40 had changed color, while the reversible indicators 34, 36, and 38 indicate that the current temperature of the blood is in the range of 1°–9° C.

The device 16 thus serves to monitor the blood temperature when the blood is susceptible to otherwise unknown amounts of warming. It both records the occurrence of warming to a predetermined temperature, and, by indicating approaching temperatures, warns that such a warming may be imminent, as well as indicating other current temperatures. The presence of the device provides assurance that the blood may be used, or may be returned to the blood bank for re-use.

It will be understood that, under conditions of warming a cold blood bag, the temperature of the indicator 40 differs from the core temperature of the blood in the bag, due to the temperature gradient existing under the nonequilibrium conditions that exist. Composition number 6 of Table I, used in the indicator 40, changes from a pseudo-irreversible phase color of dark royal blue to a color of grey at a core temperature of substantially 10° C. Table 3 sets forth data obtained when testing the indicator 40 in a simulated blood-bag-use test as described hereinabove.

TABLE 3

| Core Temperature, °C. | Bag Surface Temperature, °C. | Color of Indicator |
|---|---|---|
| 6.8 | 10.8 | First appearance of LIGHT BLUE |
| 9.9 | 13.1 | First appearance of GREY |
| 11.9 | 14.7 | Last appearance of GREY |
| 12.2 | 14.9 | First appearance of BROWN |
| 15.6 | 17.6 | Last appearance of BROWN |
| 16.3 | 18.2 | BLACK |

Due to the thermokinetics of the pseudo-irreversible phase described hereinabove, the dark royal blue color of the ordered glass state of the liquid crystal composition of the irreversible indicator 40 ultimately will spontaneously change as the composition reverts to the amorphous form, even though the temperature thereof be maintained below its 10° C. limit-temperature. Thus, an indicator 40, employing the liquid crystal composition number 6 of Table I, was found to change in color from dark royal blue to grey after storage for 24 hours under simulated blood bag refrigeration conditions encountered in practice, wherein a blood bag having a device 16 adhered thereto was stored in a refrigerator set at 2° C., and the door of the refrigerator was repeatedly opened and closed. Therefore, use under such conditions is limited to less than 24 hours.

The following examples illustrate preferred embodiments of the invention. It is to be understood that the invention is not limited to the materials, proportions, conditions, and procedures thereof, which are merely illustrative.

EXAMPLE I

Liquid Crystal Formulation

A liquid crystal composition capable of forming a metastable ordered glass is prepared in the following manner. Cholesteryl p-nonylphenyl carbonate (CNPC), 2.89 grams, and cholesteryl nonanoate, 3.68 grams, are added to a glass reaction vessel fitted with a stirrer and heat source. The beaker contents are heated to 110° C. while stirring. Care is taken to insure that the temperature of the mixture does not exceed 120° C. at any time, since CNPC discolors at temperatures higher than 120° C., and the color behavior, both in the reversible color-play and ordered glass form, is adversely affected. Cholesteryl benzoate, 1.51 grams, and dicholesteryl carbonate, 1.92 grams, are added to the heated mixture and heating and mixing are continued as before until a uniform melt is obtained.

EXAMPLE 2

Liquid Crystal Encapsulation

The composition of Example 1 is encapsulated by the following procedure. Fifty grams of 20% (w/w) aqueous solution of pigskin gelatin having a Bloom strength of 275–305 grams and an isoelectric point of pH 8–9, and 50 grams of a 20% (w/w) aqueous solution of gum arabic are stirred with 50 grams of distilled water at about 70° C. in a Waring Blendor. To this solution 100 grams of the liquid crystal composition of Example 1 at a temperature of about 100°–110° C. are added, and stirring is continued until the emulsified liquid crystal mixture has an average droplet size of 20–50 microns. While the mixture is continuously stirred at a moderate rate, an additional 580 grams of warm (70° C.) distilled water are added. The pH of the mixture is adjusted to approximately 4–5 by the dropwise addition of a buffer solution containing 11.4 parts by weight of a 20% (w/w) sodium hydroxide solution and 88.6 parts by weight of 14.7% (w/w) aqueous acetic acid.

The above mixture is first cooled slowly to room temperature and then chilled in an ice bath to below 10° C., while the mixing is continued, and 5.0 milliliters of 25% (w/w) aqueous glutaraldehyde is added. The system is allowed to stir for approximately 12 hours while slowly returning to room temperature. At the end of that time, water is removed from the suspension by filtration through a Whatman #2V, or similar paper until a concentration of approximately 28% (w/w) solids is obtained. The retentate then is passed through a 150 micron sieve to remove particles larger than about 150 microns.

After sieving, approximately 30% by weight of a 10% (w/w) aqueous solution of polyvinyl alcohol is added to the encapsulated liquid crystal suspension. The microcapsules are dispersed in the polyvinyl alcohol, which serves as a film-forming polymer matrix therefore. The pH of the suspension containing polyvinyl alcohol is finally adjusted to about 6.0 by the dropwise addition of 20% (w/w) aqueous sodium hydroxide.

EXAMPLE 3

Reversible Liquid Crystal Formulation

The reversible liquid crystal compositions 1, 2 and 3 of Table 2 are prepared by mixing the components at 90° C., in a manner analogous to that described in Example 1. Each formulation is microencapsulated as described in Example 2, with the exception that the temperature of the water initially in the Waring Blendor and later added thereto is at about 55° C. rather than at about 70° C.

EXAMPLE 4

Indicator Device Assembly

Figure 6:
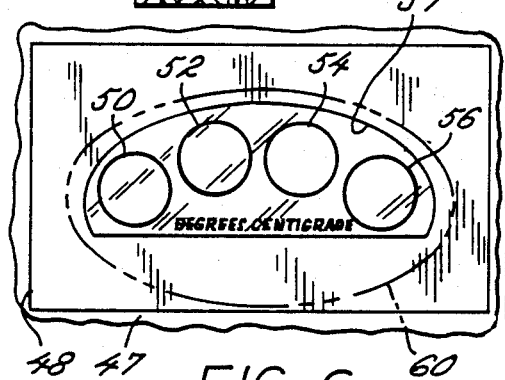
FIGS. 6-9 are plan views of components of the device, illustrated as they appear in successive stages of manufacture.
Figure 7:
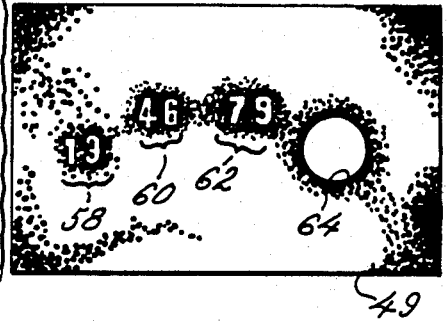
Figures 8, 9:
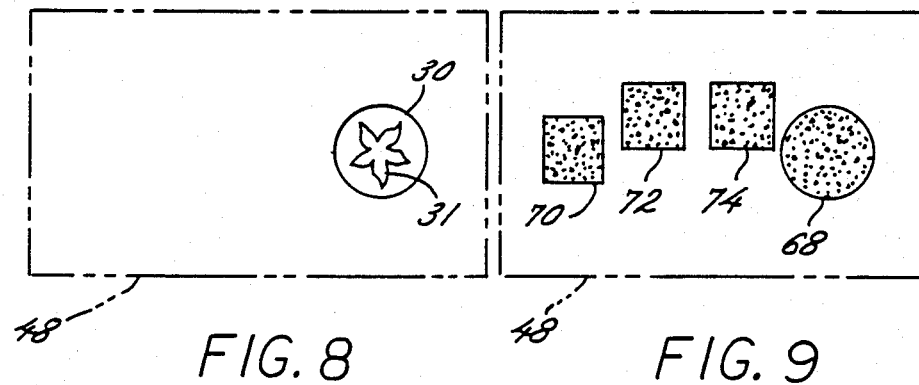

A device 16 is manufactured by the following procedure. Individual steps of the procedure are illustrated in FIGS. 6–8. The ink layers 20, 22, 23, and 30 and the liquid crystal composition indicators 34, 36, 38, and 40 are printed or deposited on the rear surface of a large polyethylene terephthalate base sheet 47 (FIG. 6), in the manufacture of a plurality of devices in each sequence of operations. FIGS. 6–8 depict the graphic appearances and the relative orientations of the several layers and printings, as viewed through the front surface of the sheet 47.

The device 16 is manufactured by a screen printing process, so that the inks used therefor preferably are of the screen printing type. They are selected for inertness, adherence, and color quality, as described above. Commercial inks found acceptable for use in the device 16 include a series of alkyd-type inks made by the Naz-Dar Company, Chicago, Ill. These inks contain an effective amount of lead naphthanate drier and employ an aliphatic solvent as the thinner. The white and blue Naz-Dar inks are flat enamels, and the black ink is a gloss enamel.

Referring to FIG. 6, white ink, such as Naz-Dar 59-192, is screen-printed through a 280-mesh graphic screen on the inner or rear surface of the base sheet 47 to form the white ink layer 20 having the graphic appearance illustrated, and a rectangular border 48. The ink is dried for 24 hours at 20°–27° C. Closely spaced circular rings 50, 52, 54, and 56 of white ink are arranged in a curved row in an elongate opening 57 in the layer 20, and they define windows in which the respective viewing areas 26, 27, 28 and 29 (FIG. 3) are provided.

After the white ink layer 20 has dried, blue ink, such as Naz-Dar Royal Blue 59-157, is screen-printed through a 330-mesh screen on the inner surface of the white ink layer 20 and dried for 24 hours at 20°–27° C., to form the blue ink layer 22. The blue ink layer 22 has the graphic appearance illustrated in FIG. 7. A rectangular border 49 of the layer 22 is congruent with the border 48 of the layer 20.

Openings 58, 60, 62 and 64 provided in the blue ink layer 22 define, successively, the respective numerical indicia "1-3", "4-6", and "7-9", and a circular space. The three indicia openings 58, 60, and 62 register with respective successive rings 50, 52, and 54 of the white layer 20, centrally thereof. The remaining circular opening 64 is in registry with the remaining ring 56 of the layer 20, at one end of the row of rings. The blue ink layer 22 fills the opening 57 in the white ink layer 20, except where the openings exist in the blue ink layer, and the blue ink is deposited on the inner surface of the base sheet 47 in the opening 57.

Referring to FIG. 8, after the blue ink layer has been dried, black ink, such as Naz-Dar Black 59-111, is screen-printed, using a 260-mesh screen, on the inner surface of the blue layer 22, in registry with the circular opening 64, to form the black ink layer 30. The ink is dried for 24 hours at 20°–27° C. The orientation of the black ink layer 30 with respect to the white and blue ink layers 20 and 22 is indicated by the positioning of the former layer 30 with respect to the border 48 of the white ink layer 20, illustrated by phantom lines. The central portion of the black ink layer 30 is received within the end ring 56 and on the inner surface of the base sheet 47. The black ink layer 30 has provided centrally therein the flower-, or star-shaped window 31.

The black layer 30 provides a contrasting surrounding color for the preferably dark royal blue color of the ordered glass state of the irreversible indicator 40, and for the grayish color indicating that the predetermined temperature has been reached. The occurrence of a black color of the indicator 40 and the resulting completely black area within the end ring 56 indicates that the predetermined temperature has been substantially exceeded.

After drying of the black ink layer 30, the microencapsulated ordered glass-forming liquid crystal suspension of Example 2 is screen-printed through a 40 mesh screen on the inner surface of such layer and within its flower-shaped opening 31. After a drying period of a minimum of 2 hours at 20°–27° C., the drying schedule used for all printings of encapsulated liquid crystal suspensions, a second such printing is made of the suspension of Example 2, to provide the irreversible indicator 40. The double thickness coating enhances perception of the irreversible color change of the liquid crystals. The coating is illustrated in FIG. 9 as the circular layer 68, oriented with respect to the white ink layer border 48 as shown.

After drying of the second printing of the microcapsules of Example 2, the suspensions made according to Example 3 and containing the reversible liquid crystal compositions 1, 2, and 3 of Table 2 are screen-printed through a 40-mesh screen on the inner surface of the blue ink layer 22, with drying between printings. The suspensions are printed in sequence, in respective viewing areas 26, 27, and 28, to provide respective reversible indicators 34, 36, and 38. The printings are illustrated in FIG. 9 as the respective square layers 70, 72, and 74, oriented with respect to the white ink layer border 48 as shown.

When the last suspension printing has dried, black ink, such as Naz-Dar Black 59-111, is printed through an 83-mesh screen to form the background layer 23, which overlies the exposed inner surfaces of all graphics and liquid crystal layers. After drying the black ink layer 23, the layer 24 of pressure-sensitive adhesive is applied, or laminated to, the inner surface of the layer 23. The application of the adhesive layer 24 and the release sheet 25 overlying the inner surface thereof is conveniently done by use of conventional adhesive-bearing sheets, such as No. 815 sheets supplied by the Fasson Industrial division of Avery International. These sheets have a layer of adhesive sandwiched between two release sheets, one of which is removed and the exposed surface of the adhesive layer laminated to the inner surface of the black ink layer 23. Alternatively, the adhesive layer 24 and the release sheet 25 may be provided in a manner such as disclosed in above-identified U.S. Pat. No. 4,310,577.

The resulting laminated assembly then is die-cut into multiple devices 16, by cutting oval units from the assembly, each in the outline represented by the broken line 80 in FIG. 6. The oval sections of the base sheet 47 become the outer supportive and protective films 18 of the devices 16.

EXAMPLE 5

Polymer Film Containing Liquid Crystals

Each of liquid crystal composition No. 6 of Table 1 and compositions Nos. 1, 2, and 3 of Table 2 is compounded as described in Example 1, and dispersed in the form of finely divided naked aggregates in a polyvinyl butyral (PVB) matrix for use as a temperature-monitoring means, by the following method according to U.S. Pat. No. 4,161,557.

Ten grams of a liquid crystal composition and 13.3 gm. of toluene are added to a vessel and stirred at room temperature until homogeneous. To another vessel is added 1.9 gm. of Pycal-94 (ICI Americas), a polyoxyethylene aryl ether surface active plasticizer; 1.9 gm. of Paraplex RGA-8 (Rohm & Haas), an oil-modified azaleic acid plasticizing resin; and 18.1 gm. of isopropanol. The foregoing mixture is stirred at room temperature until the components are evenly dispersed, and 4.1 gm. of Butvar B-72 (Monsanto Polymers and Petrochemicals), a polyvinyl butyral resin having an average molecular weight of 180,000-270,000, and 13.3 gm. of toluene are added to the mixture. Stirring at room temperature is continued until a homogeneous solution is obtained.

The toluene solution of liquid crystals is added to the polyvinyl butyral-containing solution, and the resulting solution is stirred at room temperature until it is homogeneous. The resulting solution is then deaerated by letting stand 1-2 hours at room temperature. The solution may be cast on a suitable surface, followed by evaporation of solvent, to provide a thin film of the polymer having the crystals dispersed throughout.

EXAMPLE 6

Indicator Containing Reversible and Irreversible Liquid Crystals

A temperature-monitoring device of the invention is prepared by the method of Example 4, substituting the naked liquid crystal PVB-containing solutions of composition No. 6 of Table 1 and compositions Nos. 1, 2, and 3 of Table 2 for the solutions containing the respective compositions, and applying the solutions by knife coating at a 10mil wet film thickness, rather than by screen printing.

Compositions Nos. 1-5 and 7 of Table 1 may be compounded employing the procedure of Example 1, and either encapsulated and the capsules dispersed in a matrix, employing the procedure of Example 2, or dispersed as discrete naked liquid crystal aggregates in a matrix, employing the procedure of Example 5, to provide an irreversible temperature-monitoring means. The monitoring means may serve to monitor lower predetermined temperatures, and composition Nos. 4 and 7 also may serve to monitor predetermined temperatures of an order of magnitude similar to the monitoring which may be accomplished with composition No. 6.

Depending upon the predetermined limit-temperature being monitored, one or more of the reversible compositions Nos. 1-3 of Table 2 may be employed in combination with the compositions of Table 1, to monitor temperatures approaching a predetermined limit-temperature and provide warning signals when the approaching temperatures are reached. Also, various other reversible compositions may be compounded for color display at appropriate approaching temperatures, following the teachings of the prior art, exemplified by the above-identified patents. Likewise, other irreversible and reversible liquid crystal compositions may be compounded following such teachings, for use in monitoring temperatures of the same or different order of magnitude.

Among other physiologically active substances with which the invention may be employed, immunizing biologicals are thermolabile, and are stored at reduced temperatures, generally about 1°-8° C., to maintain full potency. Many enzymes are thermolabile and must be stored at reduced temperatures in order to maintain full potency. Polymeric synthetic blood, such as Fluosol, must be stored at temperatures not exceeding minus 5° C., in order to prevent potentially dangerous particle size increase. The invention imparts an added dimension to the safeguarding of health by control of medically used substance.

EXAMPLE 7

The Glass-Transition Temperature Range and Reproducible Liquid Crystals

The glass-transition temperature minimum was found to not be equivalent to a limit-temperature for a liquid crystal in its pseudo-irreversible phase. In fact, the actual glass-transition minimum was consistently below all limit-temperatures (frequently the entire actual glass-transition temperature range is also below all limit temperatures) and is a reliable physical property for confirming the color-indicator properties of each batch of cholesteric liquid crystals.

In Table 4, the glass-transition temperature range of four cholesteric liquid crystals, formulated as discussed in Examples 1-2, and their red to blue color-play temperature ranges are illustrated. These color-play temperatures were measured from the first appearance of a red color to the first appearance of a blue color. The composition 6 is the same liquid crystal composition as in Tables 1 and 2; however, the supply of composition 6 was depleted before the actual glass-transition temperature range could be determined. Analyses for the glass-transition temperature range were performed on a Perkin-Elmer ® model DSC-2 Differential Scanning Calorimeter. Non-encapsulated cholesteric liquid crystal paste samples were loaded into the instrument at 23° C. and quench-cooled to −60° C. Each sample was held at −60° C. for 10 minutes and gradually warmed to 50° C. at a rate of 20° per minute. The glass-transition temperature ranges in Table 4 were determined by measuring the heat capacity displacement.

Compositions 8 and 9 were used in the production of the HemoTemp ®II blood bag monitor. Composition 10 was formulated to detect limit-temperatures at or above −20° C. The glass-transition temperature minimum for composition 10 is −23° C. Samples of composition 10, quenched to below −23° C. have been stored at −23° C. or lower for over two years while maintaining their dark royal blue color. These liquid crystals are in their irreversible phase. When compositions 8 and 9 are quenched to 2° C., which is above their glass-transition minimum, they maintain their pseudo-irreversible blue color for 24 to 185 hours. However, if composition 9 is quenched to −5° C., and stored at that temperature, a blue color has been retained for over 43 days.

TABLE 4

| Composition | Cholesteric Liquid Crystal Composition Parts by Weight | | | | | ELC Red to Blue Temp. Range °C. | Glass-Transition Temperature Range °C. |
|---|---|---|---|---|---|---|---|
| | CNPC | CN | CBz | DCC | CCl | | |
| 6 | 28.9 | 36.8 | 15.1 | 19.2 | — | 26.7–32.5 | — |
| 8. | 24.5 | 39.1 | 14.5 | 21.9 | — | 27.2–28.7 | −12 to +2 |
| 9 | 27.0 | 31.0 | 20.0 | 22.0 | — | 28.0–30.6 | −8 to +4 |
| 10 | 36.5 | 45.3 | 9.1 | — | 9.1 | 32.8–34.1 | −23 to −11 |

The following abbreviations have been used for cholesteric liquid crystal esters: "CNPC" is Cholesteryl p-nonylphenyl carbonate, "CN" is Cholestery nonanoate, "CBz" is Cholesteryl benzoate, "DCC" is Dicholesteryl carbonate, "CCl" is Cholesteryl chloride, and "CPB" is Cholesteryl-phenyl benzoate.

Therefore, when quenched to a temperature above the glass transition temperature minimum but below the color-play temperature range, the liquid crystals are in their pseudo-irreversible phase. When quenched and maintained below the glass-transition temperature minimum, the color is indefinitely stable (at least 1 year or more) and are said to be in their irreversible phase. The critical $T_g$ temperature for the irreversible phase is the glass-transition temperature minimum.

The pseudo-irreversible phase represents a transition state between the completely reversible state as in the color-play temperature range, and an irreversible phase as when the liquid crystal is quenched from the color-play region to below the glass-transition temperature minimum.

The characteristics of several formulations, compositions 6, 8, 9 and 10 are shown in Table 4. As can be seen in Table 4, compositions 8 and 9 which have a useful limit-temperature of 10°±2° C. in their pseudo-irreversible phases have a glass-transition temperature range of −12° to +2° C. and −8° to +4° respectively. Therefore, surprisingly the limit-temperature and the glass-transition temperature range are not equivalent or even overlapping with limit-temperatures for liquid crystals in their pseudo-irreversible phases.

Reproducibility has long been a problem between batches of cholesteric liquid crystals. The goal is consistent pseudo-irreversible phase performance characteristics, primarily this goal is the time during which a formulation will retain its quenching color when used for detecting a limit-temperature. Compositions 8 and 9 in Table 4 were intended to both have utility as indicators of a 10° C. limit-temperature. However, the compositions had to be modified to achieve consistent color-indicator properties.

It was then discovered that variability in the composition of the biological cholesteric raw materials created uncontrollable variations in each batch but that these variations could be readily detected by measuring the glass-transition temperature range. In Table 4, batch composition 9 had a 181 hour 2° C. temperature response time (blue to non-blue color change), while that of composition 8 was only 67.5 hours. The required tests under the FDA Master Device Record regulations resulted in similar results for compositions 8 and 9 in the "water bath ramp test" and the "static bag test". The glass-transition temperature ranges differed significantly, compositions 8 and 9 had glass-transition temperature ranges of −12° to +2° C., and −8° to +4° C., respectively. These differences indicated that the liquid crystal formulations would also differ in their temperature/time indication properties.

Each indicator in Table 5 was heated to a temperature slightly above its color-play temperature range and then immediately affixed to a blood bag containing distilled water and precooled to the quenching temperature indicated. A surface temperature electronic probe (YSI 709A, Yellow Springs Instrument Co., Inc., Yellow Springs, Ohio) was taped to the unlabeled side of the bag, near the indicator label. The temperature probe was connected to a DigiTec ® Model 5800 portable digital thermometer (United Systems Corp., Dayton, Ohio) to obtain a digital read-out of the surface temperature. The blood bags were then placed on a laboratory bench at room temperature (22°–25° C.), and the room temperature limit-temperatures, i.e., the surface temperatures at which the indicators changed color from deep royal blue to a non-blue color, were measured for each indicator. The results, shown in Table 5, demonstrate the effect of glass-transition temperature range on the resulting limit-temperature.

TABLE 5

Part A

| Composition No. | Cholesteric Liquid Crystal Composition Parts by Weight | | | | | |
|---|---|---|---|---|---|---|
| | CNPC | CN | CBz | DCC | CCl | CPB |
| 10 | 36.5 | 45.3 | 9.1 | — | 9.1 | — |
| 9 | 27.0 | 31.0 | 20.0 | 22.0 | — | — |
| 13 | 24.4 | 29.1 | 8.0 | 21.9 | — | 16.5 |

Part B

| Composition No. | $T_g$ Range °C.[1] | Quenching Temperature °C. | Limit Temperature °C.[2] |
|---|---|---|---|
| 10 | −23 to −11 | −23 to −24 | 1.5 |
| 9 | −8 to +4 | 2 | 16.3 |
| 13 | −7 to +10.5 | 2 | 19.6 |

[1]Analyses performed on a Perkin-Elmer Model DSC-2 Differential Scanning Calorimeter. Cholesteric liquid crystal paste samples (non-encapsulated) were loaded into the instrument at 22 or 23° C. and quench-cooled to −60 or −63° C. They were held at the low temperature for 10 minutes and then were heated to 37 or 50° C. at 20°/minute. The glass-transition temperature ranges were determined by measuring the heat capacity displacements.
[2]Surface temperature when activated indicator, affixed to blood bag and incubated at room temperature (22-25° C.), changed from blue to a non-blue color.

Each indicator in Table 6 was heated to a temperature slightly above its color-play temperature range and then immediately affixed to a blood bag containing distilled water; the bag and its contents had been previously precooled to 2° C. Blood bags for each indicator, except that produced from composition 8, were then placed in a 4000 ml glass beaker waterbath at 2° C. as described hereinafter. The blood bag for the indicator produced from composition 8 was placed in a laboratory refrigerator having an internal temperature of 2±1° C. The limit-temperature response times at 2° C., i.e., the times required for the indicators to change color from deep royal blue to a non-blue color, were measured for each indicator. The results, shown in Table 6, demonstrate the dramatic effect that glass-transition temperature ranges have on limit temperature response times. They further indicate the significant influence of liquid crystal raw material purity on the performance characteristics of irreversible indicators.

TABLE 6

Part A

| Composition No. | Cholesteric Liquid Crystal Composition Parts by Weight | | | |
|---|---|---|---|---|
| | CNPC | CN | CBz | DCC |
| 8 | 24.5[2] | 39.1 | 14.5[3] | 21.9 |
| 11 | 24.5[4] | 39.1 | 14.5[3] | 21.9 |
| 9 | 27.0[5] | 31.0 | 20.0[3] | 22.0 |
| 12 | 27.0[5] | 31.0 | 20.0[6] | 22.0 |

Part B

| Composition No. | ELC Red to Blue Temp. Range, °C. | $T_g$ Range °C.[1] | 2° C. Limit Temperature Response Time, hours |
|---|---|---|---|
| 8 | 27.2–28.7 | −12 to +2 | 67.5 |
| 11 | 27.2–28.7 | −13 to −2 | 56 |
| 9 | 28.0–30.6 | −8 to +4 | 181 |
| 12 | 27.6–30.2 | −9 to +3 | 117 |

[1] See footnote 1 for Table 5
[2] CNPC Lot A
[3] CBz Lot Y
[4] CNPC Lot B
[5] CNPC Lot C
[6] CBz Lot Z

EXAMPLE 8

Pseudo Irreversible Indicators as Temperature and/or Time Varies

Figure 10A:
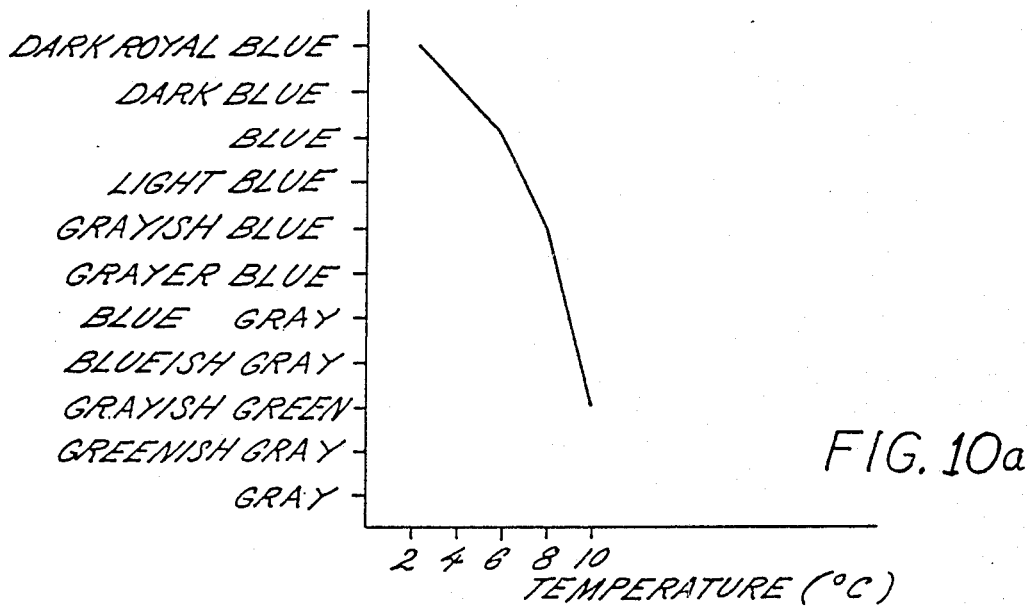
FIG. 10 contains graphs illustrating (1) the effect of temperature (FIG. 10A) on the color of cholesteric liquid crystals after 2 hours, and (2) the effect of time (FIG. 10B) on the color of cholesteric liquid crystals at 6° C.
Figure 10B:
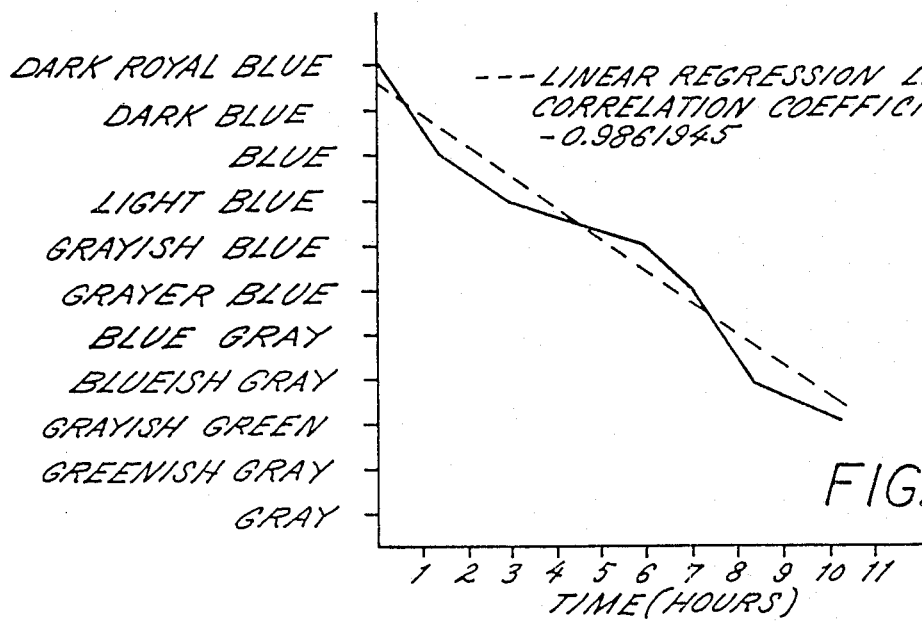

The color of a pseudo-irreversible phase cholesteric liquid crystal at a constant time period varies as a function of the temperature of incubation (FIG. 10a). Similarly, the color at a constant temperature varies as a function of time of incubation (FIG. 10b). FIGS. 10a and 10b illustrate the thermokinetic or time/temperature dependence of liquid crystal irreversible indicators.

Irreversible or pseudo-irreversible phase cholesteric liquid crystal formulations are encapsulated by the methods of Examples 1–2 and are screen printed on polyethylene terephthalate by a method described in Example 4.

Indicator performance was determined by affixing the indicator to a blood bag (Fenwall Lab division of Travenol Labs, Inc., Deerfield, Ill. 60015; bag contains 63 ml of Anticoagulant citrate phosphate dextrose adenine solution as received from the manufacturer) containing approximately 367 gm of distilled water. The blood bag with the affixed indicator was then placed in a 7 in.×8 in. zip-lock freezer bag, and this unit was placed in a 4000 ml glass beaker waterbath containing distilled water. Copper cooling coils (copper tubing of ¼ in. internal diameter and 5/16 in. external diameter was bent into coils of approximately 5 in. diameter) were placed in the glass beaker waterbath and connected to a PolyTemp ® Model 90 low temperature bath and circulator (PolyScience Corporation, Niles, Ill. 60648) to maintain a specific constant temperature in the glass beaker waterbath. The fluid circulating in the copper coils was a 1:1 mixture by volume of distilled water and isopropyl alcohol. The distilled water in the glass beaker was mixed by a Talboys T-line continuous duty motorized stirrer, Model number 103 (Talboys Engineering Corp.) to maintain a constant temperature in the glass beaker waterbath. A glass thermometer was suspended in the glass beaker waterbath and the PolyTemp ® circulator was adjusted to provide the specific constant temperature used for each test.

An indicator manufactured from encapsulated pseudo-irreversible phase cholesteric liquid crystal composition no. 8 was heated to a temperature of approximately 30° C. and then immediately affixed to a blood bag containing approximately 367 gm of distilled water at 2.5° C. (quenching). The bag was then incubated in a waterbath as previously described. Five specific incubation temperatures, 2°, 4°, 6°, 8°, and 10° C. were tested. For each specific temperature tested, the temperature was maintained at least until the color of the indicator changed from its initial dark royal blue color to a color which no longer contained any blue. The color of the indicator at each specific temperature was recorded at various time intervals to determine the performance characteristics of the formulation. The results, shown in Tables 7 and 8, further illustrate the thermokinetic dependence of liquid crystal irreversible indicators.

TABLE 7

The colors of the pseudo-irreversible phase indicator composition no. 8 after two hours of incubation at each temperature are shown in the following table:

| INCUBATION TEMPERATURE | INDICATOR COLOR AFTER INCUBATION FOR TWO HOURS AT THAT TEMPERATURE |
|---|---|
| 2° C. | Dark Royal Blue |
| 4° C. | Dark Blue |
| 6° C. | Blue |
| 8° C. | Grayish Blue |
| 10° C. | Grayish Green |

TABLE 8

The colors of the pseudo-irreversible phase indicator composition no. 8 after incubation at 6° C. for various time periods are shown in the following table:

| INCUBATION TIME (hours) | INDICATOR COLOR AFTER INCUBATION AT 6° C. FOR THAT TIME |
|---|---|
| 0 | Dark Royal Blue |
| 1.5 | Blue |
| 3.0 | Light Blue |
| 4.5 | Blue with slight gray |
| 6.0 | Grayish Blue |
| 7.0 | Grayer Blue |
| 8.5 | Bluish Gray |
| 10.5 | Grayish Green |

Figure 11:
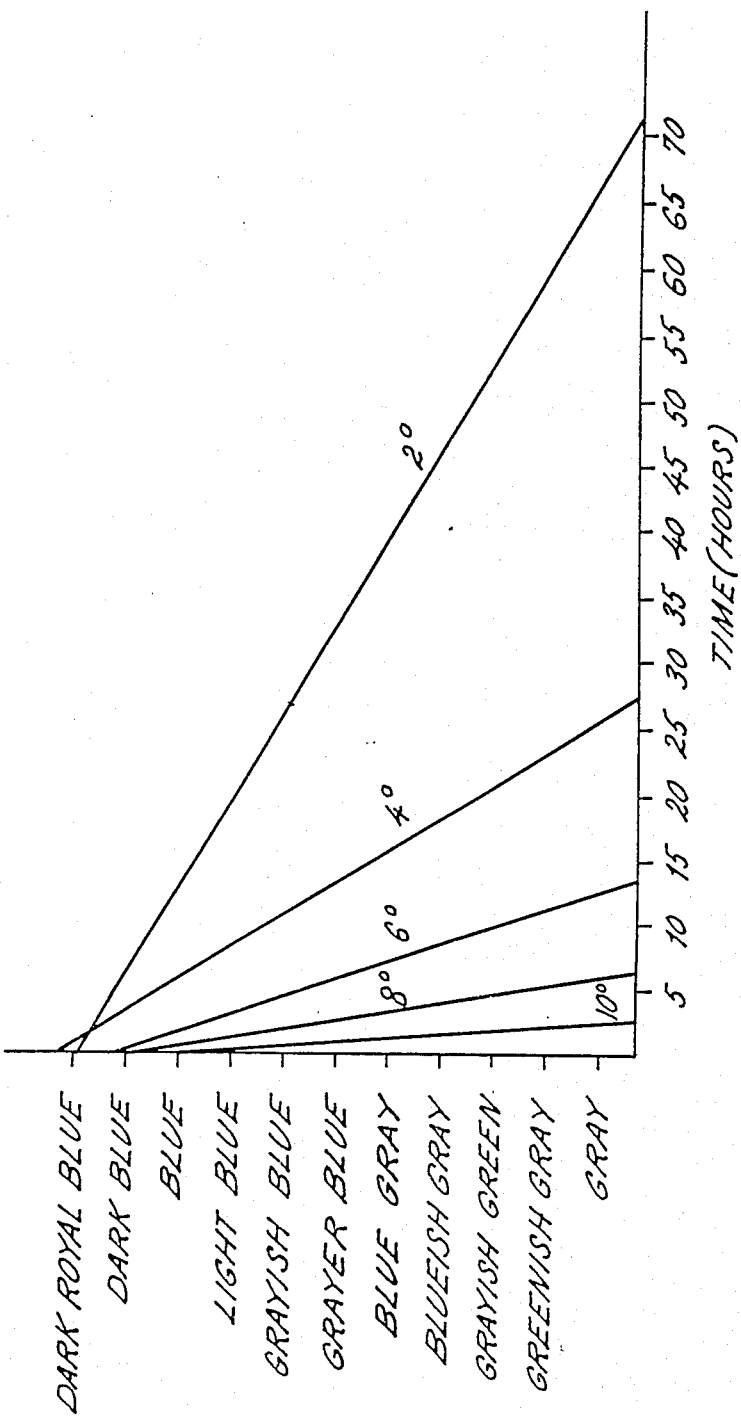
FIG. 11 illustrates in graphic form the color of cholesteric liquid crystals at various temperatures as a function of time at that temperature.

The effects of both time and temperature on the color of liquid crystal irreversible indicators in their pseudo-irreversible phase are further illustrated in FIG. 11.

We claim:

1. Time/temperature-monitoring means comprising a choloesteric liquid crystal material having an irreversible phase wherein said material quenched from a first temperature at or above its color-play temperature range to a second temperature below its color-play temperature range while retaining a color characteristic of said material at said material at said first temperature, wherein said material has a pseudo-irreversible liquid crystal phase at a temperature below said color-play temperature range and at a temperature above said irreversible phase, said pseudo-irreversible phase being the only phase located between said color-play temperature range and said irreversible phase, said material having a defined time-dependent temperature-dependent limit said pseudo-irreversible liquid crystal phase, wherein when said limit is exceeded, said material exhibits a color change which is irreversible by cooling.

2. The time/temperature-monitoring means of claim 1 suitable for monitoring a heat-degradable physiologically active substance contained in a heat conductive container and maintained at a holding temperature below said defined limit-temperature, said time/temperature-monitoring means being adapted to be placed in heat-transfer relation to said container at said holding temperature and upon warming to a limit-temperature in the pseudo-irreversible range exhibits an irreversible color change when said substance reaches said defined limit-temperature, thereby providing a visual indication of whether the temperature of said substance has risen to said defined limit-temperature at any time after said time-temperature-monitoring means was placed in said heat-transfer relation.

3. Time/temperature-monitoring means of claim 2 wherein said substance comprises a biological, a blood component, or a polymeric synthetic blood product.

4. Time/temperature-monitoring means of claim 2 wherein said substance comprises a blood component and said container is a medical blood bag.

5. Time/temperature-monitoring means of claim 4 wherein said defined limit-temperature is about 10° C.

6. Time/temperature-monitoring means of claim 2 wherein said material includes at least one member selected from the group consisting of cholesteryl benzoate and dicholesteryl carbonate.

7. Time/temperature-monitoring means of claim 6 wherein said material also includes cholesteryl p-nonylphenyl carbonate.

8. Time/temperature-monitoring means as defined in claim 7 wherein said material further includes cholesteryl nonanoate.

9. Time/temperature-monitoring means of claim 2 wherein said cholesteric liquid crystalline material exhibits a glass-transition temperature range of $-7°$ to $+10.5°$ C.

10. Time/temperature-monitoring means of claim 9 wherein said cholesteric liquid crystalline materials comprise cholesteryl p-nonylphenyl carbonate, cholesteryl nonanoate, cholesteryl benzoate and discholesteryl carbonate.

11. Time/temperature-monitoring means of claim 10 wherein said material includes, in approximate percentage by weight, 27.0% cholesteryl p-nonylphenyl carbonate, 31.0% cholesteryl nonanoate, 20.0% cholesteryl benzoate, and 22.0% dicholesteryl carbonate.

12. Time/temperature-monitoring means of claim 2 wherein said cholesteric liquid crystalline material exhibits a glass-transition temperature range of $-8°$ to $+4°$ C.

13. Time/temperature-monitoring means of claim 12 wherein said cholesteric liquid crystalline materials comprise cholesteryl p-nonylphenyl carbonate, cholesteryl nonanate, cholesteryl benzoate and dicholesteryl carbonate.

14. Time/temperature-monitoring means of claim 13 wherein said materials includes in approximate percentage by weight, 24.4% cholesteryl p-nonylphenyl carbonate, 29.1% cholesteryl nonanoate, 8% cholesteryl benzoate and 21.9% dicholesteryl carbonate.

15. Time/temperature-monitoring means of claim 2 and further comprising a second cholesteric liquid crystal-line material which when the said time/temperature-monitoring means is placed in said heat-transfer relation exhibits a reversible color change in its color-play temperature range as the temperature of said time/temperature-monitoring means approaches said defined limit-temperature.

16. Time/temperature-monitoring means of claim 15 wherein said substance comprises a blood component, said defined limit temperature is about 10° C., and said second material exhibits said color change when the temperature of said substance is in a range of about 1° C. to 9° C.

17. Time/temperature-monitoring means of claim 15 wherein said first-named materials includes cholesteryl p-nonylphenyl carbonate, cholesteryl nonanoate, cholesteryl benzoate, and dicholesteryl carbonate; and said second material includes cholesteryl nonanoate, cholesteryl oleyl carbonate, and cholesteryl chloride.

18. Time/temperature-monitoring means as defined in claim 17 wherein the components of said materials are present in the following approximate proportions, in percentages by weight:

| First Named Material | |
| --- | --- |
| Component | Proportion |
| Cholesteryl p-nonylphenyl carbonate | 27.0 |
| Cholesteryl nonanoate | 31.0 |
| Cholesteryl benzoate | 20.0 |
| Dicholesteryl carbonate | 22.0 |
| Second Material | |
| Cholesteryl nonanoate | 55.4 |
| Cholesteryl oleyl carbonate | 33.4 |
| Cholesteryl chloride | 11.2 |

19. Time/temperature-monitoring means of claim 1 suitable for monitoring a heat-conductive container encasing a substance and maintained at a holding temperature below a defined limit-temperature for minimizing degradation thereof, said time/temperature-monitoring means being adapted to be placed in heat-transfer relation to said container at said holding temperature and comprising a cholesteric liquid crystalline material dispersed in a film-forming polymer matrix, said material being capable of existing at a temperature below its color-play temperature range in characteristic mestable ordered glass state exhibiting a color normally exhibited in its color-play temperature range, the color of said material irreversibly changing, upon warming to its limit-temperature, and when the time/temperature-monitoring means is placed in said heat-transfer relation said material exhibiting an irreversible color change when said substance substantially reaches said defined limit-temperature upon warming, thereby providing a visual indication of whether the temperature of the substance has risen substantially to said defined limit-temperature at any time after the temperature-monitoring means is placed in said heat-transfer relation.

20. Time/temperature-monitoring means of claim 19 wherein said substance comprises a biological, a blood component, or a polymeric synthetic blood product.

21. Time/temperature-monitoring means of claim 20 wherein said material is microencapsulated in capsules formed of gelatin-gum arabic, and the capsules are dispersed in said matrix.

22. Time/temperature-monitoring means of claim 21 wherein said matrix is polyvinyl alcohol.

23. Time/temperature-monitoring means of claim 19 wherein said substance comprises a blood component and said container is a medical blood bag.

24. Time/temperature-monitoring means of claim 23 wherein said defined limit-temperature is about 10° C.

25. Time/temperature-monitoring means of claim 19 wherein said material is microencapsulated, and the capsules are dispersed in said matrix.

26. Time/temperature-monitoring means of claim 25 wherein said capsules are formed of gelatin-gum arabic.

27. Time/temperature-monitoring means of claim 26 wherein said matrix is polyvinyl alcohol.

28. Time/temperature-monitoring means of claim 19 wherein said material is dispersed in said matrix in the form of finely divided naked aggregates.

29. Time/temperature-monitoring means of claim 28 wherein said matrix is polyvinyl butyral, polyurethane, or an acrylic resin.

30. Time/temperature-monitoring means of claim 19 and further comprising a second cholesteric liquid crystalline material dispersed in a second film-forming polymer matrix, said second material when the temperature-monitoring means is placed in said heat-transfer relation exhibiting a reversible color change in its color-play temperature range when the temperature of said substance approaches said defined limit-temperature upon warming, to give a visual warning of such approach.

31. Time/temperature-monitoring means of claim 30 wherein said substance comprises a blood component, said defined temperature is about 10° C., and said second material exhibits said color change when the time/temperature of said substance is in a range of about 7° C. to 9° C.

32. Time/temperature-monitoring means of claim 30 wherein each of said first and second materials is microencapsulated, and the capsules containing the materials are dispersed in their respective matrices.

33. Time/temperature-monitoring means of claim 32 wherein said capsules are formed of gelatin-gum arabic, and for each matrix the polymer is polyvinyl alcohol.

34. Time/temperature-monitoring means of claim 30 wherein each of said first and second materials is dispersed in its matrix in the form of finely divided naked aggregates, and for each matrix the polymer is polyvinyl butyral, polyurethane, or an acrylic resin.

* * * * *

UNITED STATES PATENT AND TRADEMARK OFFICE
CERTIFICATE OF CORRECTION

PATENT NO. : 4,859,360

DATED : August 22, 1989

INVENTOR(S) : Fred K. Suzuki, Sharon M. Mead, Noble H. Yoshida, Robert H. Dobberstein It is certified that error appears in the above—identified patent and that said Letters Patent is hereby corrected as shown below:

Col. 8, line 44, change "qlass" to --glass--.

Col. 25, line 15, change "Cholestery" to --Cholesteryl--.

Col. 25, line 16, change "Cholesteryl-phenyl" to --Cholesteryl-p-phenyl--.

Col. 28, line 58 (Claim 1) delete "at said material".

Col. 28, line 66 (Claim 1) after "limit" insert --in--.

Col. 30, lines 14-15 (Claim 17) change "cholesteryl oleyl" to --cholesteryl-oleyl--.

Col. 30, line 42 (Claim 19), change "mestable" to --metastable--.

Signed and Sealed this

Eleventh Day of September, 1990

Attest:

HARRY F. MANBECK, JR.

Attesting Officer    Commissioner of Patents and Trademarks